June 15, 1926.

L. L. EDMUNDS

MACHINE FOR MAKING FILTER PRESS LEAVES

Filed April 13, 1925   3 Sheets-Sheet 1

1,588,953

INVENTOR.
Louis Lake Edmunds
BY
ATTORNEYS

June 15, 1926.
L. L. EDMUNDS
1,588,953
MACHINE FOR MAKING FILTER PRESS LEAVES
Filed April 13, 1925   3 Sheets-Sheet 2
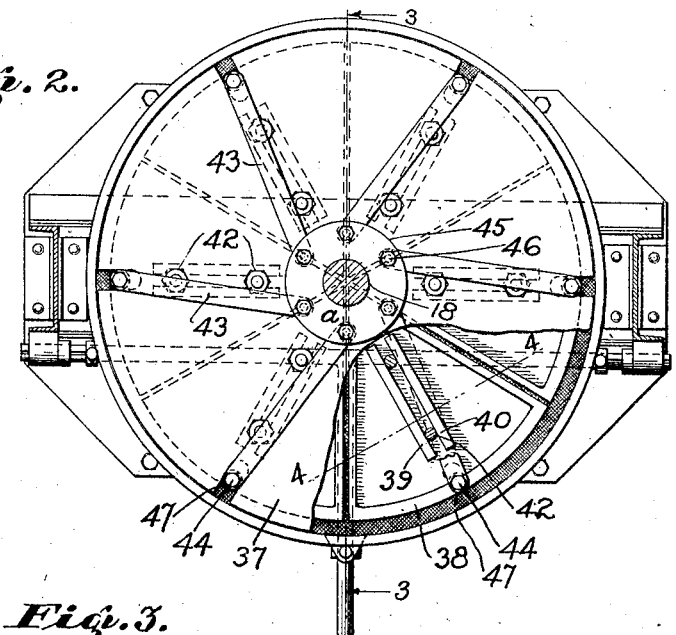
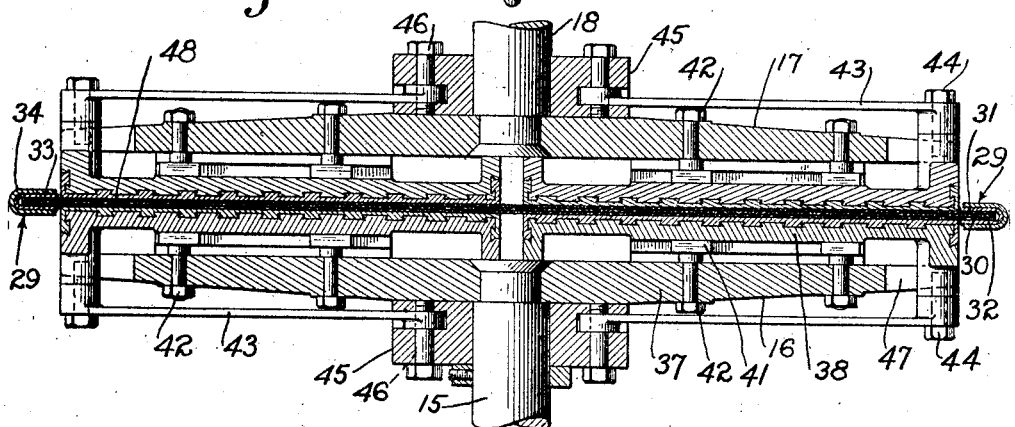
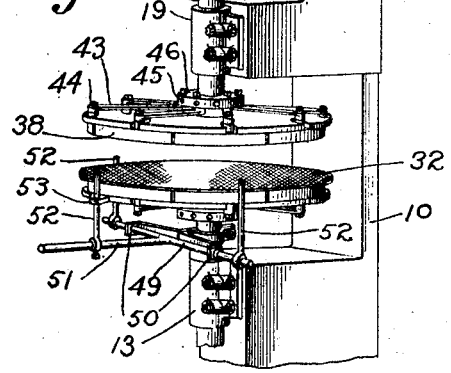
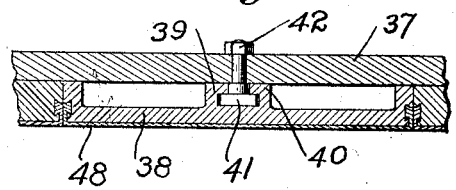
INVENTOR.
Louis Lake Edmunds
BY
Dewey, Strong, Townsend & Loftus
ATTORNEYS.

June 15, 1926.
L. L. EDMUNDS
1,588,953
MACHINE FOR MAKING FILTER PRESS LEAVES
Filed April 13, 1925  3 Sheets-Sheet 3
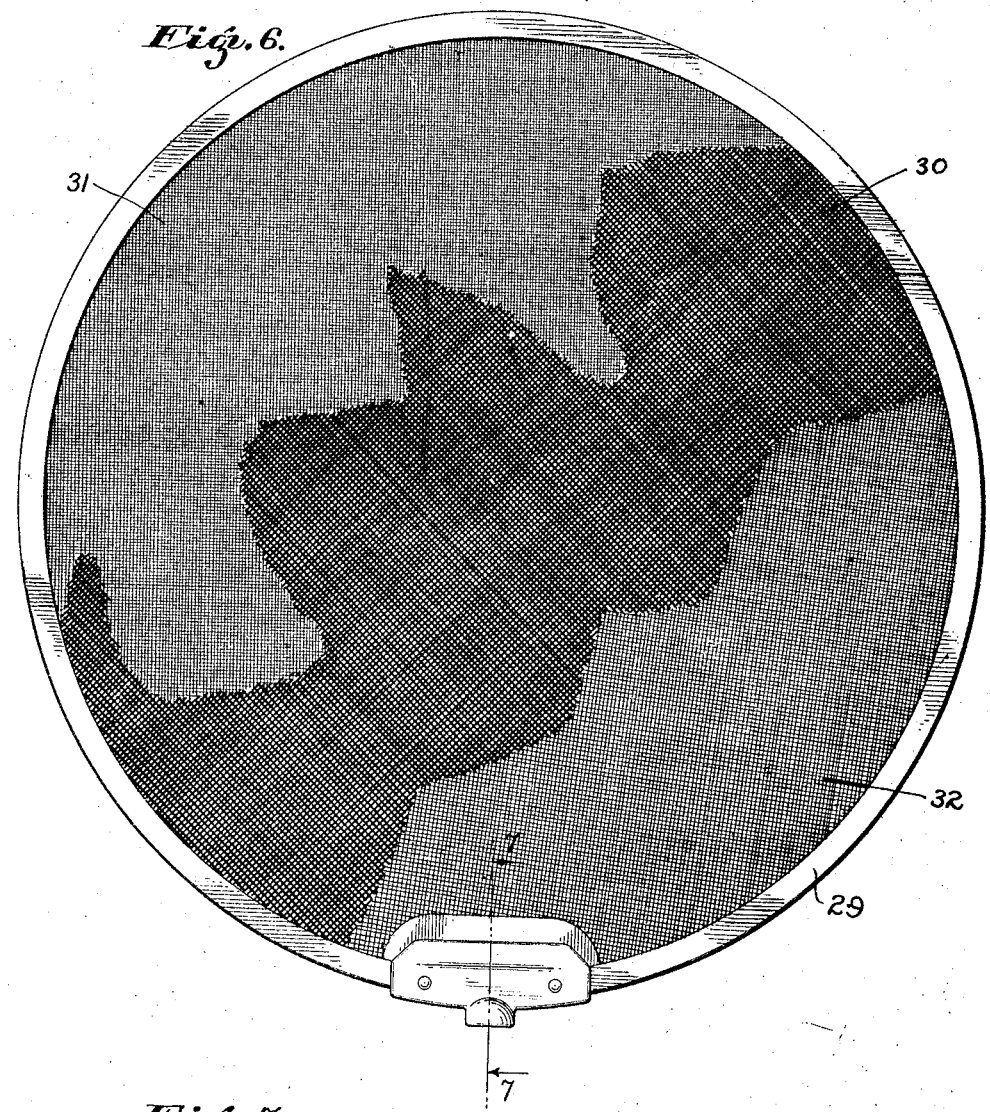
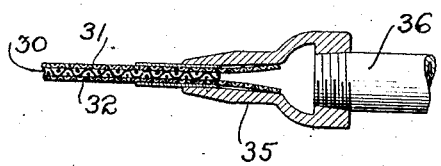
INVENTOR.
Louis Lake Edmunds
BY
ATTORNEYS.

Patented June 15, 1926.

1,588,953

UNITED STATES PATENT OFFICE.

LOUIS LAKE EDMUNDS, OF CROCKETT, CALIFORNIA.

MACHINE FOR MAKING FILTER-PRESS LEAVES.

Application filed April 13, 1925. Serial No. 22,712.

This invention relates to a machine tool, and particularly pertains to a machine for assembling filter press leaves.

In order to secure a satisfactory metal covered filtered leaf, such as is used in the leaf of the Sweetland type of filter, it is necessary and highly desirable to have the fine or outer screens of the filter leaf stretched tightly over the inner of core screen, and with this particular result in view, it is the principal object of the present invention to provide a machine by which the thin screens may be tightly stretched and held in position over the core while their edges are being bound in a manner to prevent them from becoming loose or "baggy" with relation to the core onto which they are applied.

The present invention contemplates means for centering the screens relative to the core, thereafter stretching the screens in their center position and then securing the screens and the cores together along their marginal edges while the screens are maintained in a tightly stretched condition.

The invention is illustrated by way of example in the accompanying drawings, in which:

Fig. 2 is a view in plan showing the upper clamping chuck as seen on the line 2—2 of Fig. 1.

Fig. 3 is a view in central vertical section through the upper and lower clamping chucks as seen on the line 3—3 of Fig. 2, and more particularly disclosing the position of an assembled filter leaf therein and the operating mechanism of the stretchers.

Fig. 4 is a view in transverse section through one of the stretcher segments, as seen on the line 4—4 of Fig. 2.

Fig. 5 is a fragmentary view in perspective showing the manner in which the screens are centered relative to the chucks.

Fig. 6 is a view in side elevation showing the completed filter leaf.

Fig. 7 is a view in transverse section through the outlet fitting of the filter leaf, as seen on the line 7—7 of Fig. 6.

Figure 1:
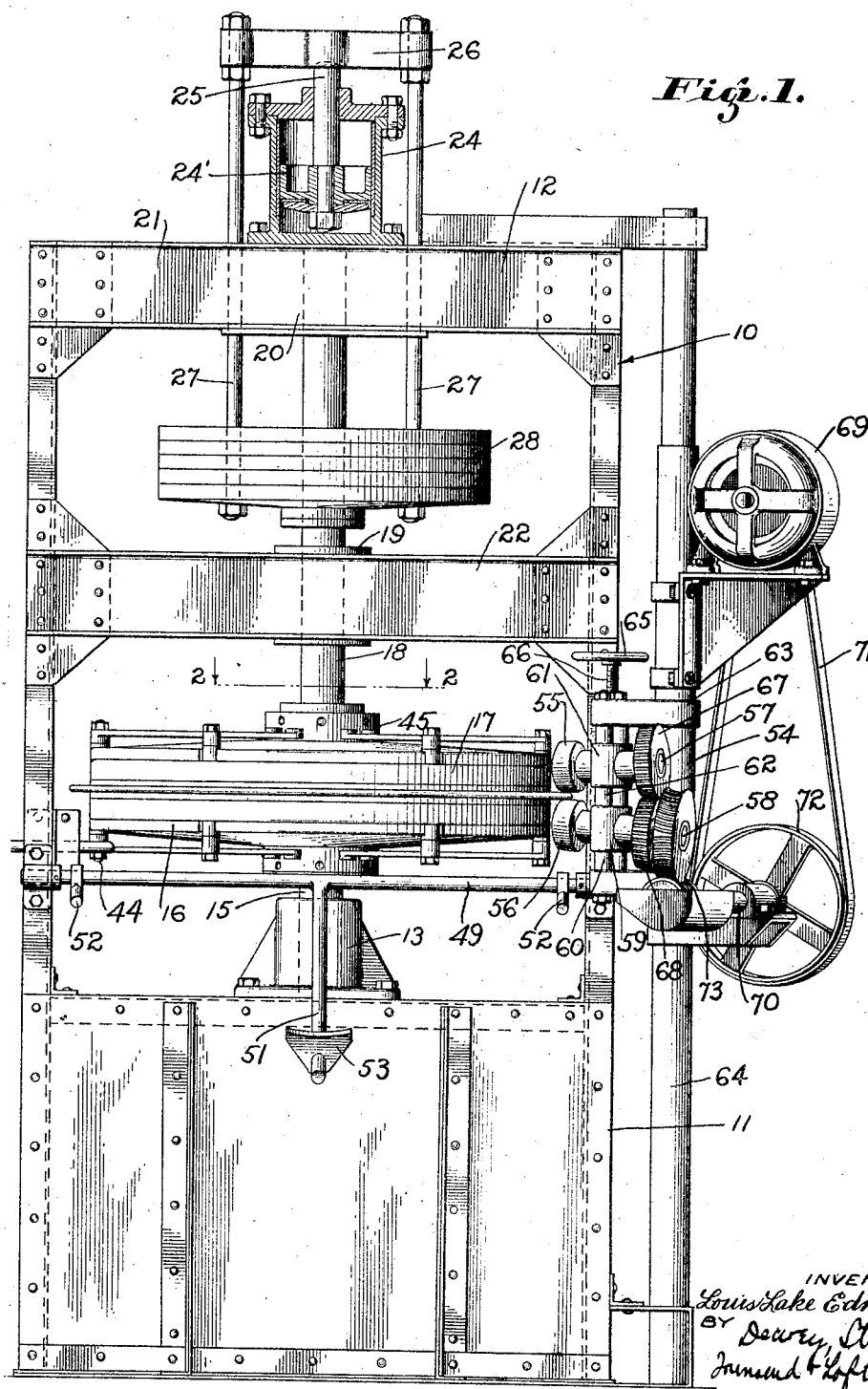
Fig. 1 is a view in side elevation showing the machine with which the present invention is concerned.

Referring more particularly to the drawings, 10 indicates a main frame structure of any preferred design, and which structure consists of a subframe portion 11 and a superframe 12. The subframe carries a vertical bearing 13 within which is rotatably supported a spindle 15. Mounted on the upper end of this spindle is a lower chuck plate structure 16, the clamping face of which is disposed in a horizontal plane.

An upper chuck plate 17 is disposed with its lower face in parallel alignment with the upper face of the lower chuck plate, and is carried by a spindle 18. The details of the chuck plate structures are more clearly shown in Figs. 2, 3 and 4 of the drawings, and will be hereinafter more fully described.

The chuck spindles 15 and 16, as shown in Fig. 1 of the drawings, are in vertical longitudinal alignment. The upper spindle 18 is designed to reciprocate through bearings 19 and 20 carried by cross-frame members 21 and 22 of the superstructure 12. This reciprocation may be brought about by a fluid pressure cylinder 24 mounted on the cross frame member 23 and enclosing a vertically reciprocating piston 24. The rod 25 of this piston is secured to a horizontally extending cross head 26, from which cross head operating rods 27 depend. These rods extend vertically and parallel with each other along opposite sides of the spindle 21. The rods 27 are connected with a weight structure 28 carried by the upper chuck spindle 18, so that the action of the fluid pressure cylinder 24 against its piston 24' will tend to lift the weights 28, as well as the spindle 18 and the upper chuck member carried thereby, thus separating the clamping faces of the upper chuck member 17 and the lower chuck member 16 when it is desired to assemble the elements of a filter leaf.

The construction of a filter to be assembled in this machine can be readily understood by reference to Figs. 6 and 7, where it will be seen that a circular binder 29 surrounds a central reticulated core 30 of circular formation, said core being constructed of coarse stiff metal fabric, and upon opposite sides of which core are deposited thin metal screens 31 and 32, which screens are stretched over the core and held in their stretched position by the marginal binder 29.

As more clearly disclosed in Fig. 3, this binder comprises an inner lead gasket 33 and an outer hoop 34, both the gasket and hoop being of U-shaped section and surrounding the circumferential edge of the screens 30, 31 and 32, and being bent thereover to clamp the screens together throughout the length of their margins. As shown in Fig.

7, an outlet fitting 35 is fastened onto the screen structure clamping the opposite sides thereof and providing a threaded connection for a drain pipe 36.

The present invention is particularly concerned with the application of the thin mesh metal screens 31 and 32 to the opposite sides of the coarse screen core 30, and to the application of the binder 29 in a manner to hold the thin mesh screens in a stretched position with relation to the core.

This operation may be more readily understood by reference to Figs. 2, 3 and 4, where it will be seen that the upper and lower chuck structures 16 and 17 each comprise a disk 37 forming a backing plate, and upon which disk a plurality of radially moving clamping segments 38 are mounted. By reference to Fig. 4, it will be understood that each of these clamping segments is formed with parallel ways 39 and 40 for receiving the enlarged head 41 of bolts 42. By this arrangement the segments may slide radially when actuated by pitman rods 43, which are pivotally secured to the outer ends of the segments by bolts 44 and are pivotally secured to an actuating disk 45 on pins 46. The disk 45 is mounted upon spindle 18 for free rotation therearound, and as the rods 43 are normally in an off center non-radial position, it is apparent that when the disk 45 is rotated in the direction of the arrow —a— as seen in Fig. 2, the outer ends of the rods 43 will move outwardly along radial slots 47 in the back plates 37 of the chucks, and will thus simultaneously move all of the segments radially and in horizontal planes, the segments of the upper chuck moving in one horizontal plane and the segments of the lower chuck moving in another horizontal plane parallel thereto.

In order that there shall be a desired frictional contact between the chuck segments and the fabric screens 31 and 32, the working faces of these segments are covered with a lead fastening 48 which is fastened into place by a formation of dove-tailed grooves in the segments and into which dove-tailed tenons of the lead facings fit, said tenons and grooves extending transversely of the radial path of travel of the segments.

Means for centering the screens with relation to each other and the chuck plates is clearly shown in Fig. 5, where it will be seen that a shaft 49 extends horizontally and is carried by bearings 50. This shaft has a projecting member 51 disposed at ninety degrees to it, thus forming a T-shaped structure thereof. On the three arms of this structure are adjustably mounted stop fingers 52, which may be swung upwardly to a vertical position and will then center the screens relative to each other and the chuck plate. A limit stop 53 is carried by the finger 52 mounted on the projecting arm 51 and is designed to abut against the edge of the lower chuck backing plate 37 to limit the upward swinging movement of the fingers.

One operation incident to the final assembly of the filter leaves is the application of the binding structure 29 to the circumferential edge of the screens. As previously described, this binding member comprises a lead gasket 33 and an outer member 34. This structure is formed of distorted U-shaped section, so that it may be slipped into position around the edges of the core and over the edges of the stretched screens 31 and 32.

When this has been done, the rolling structure 54 may be swung into position to crimp the binder down around the margin of the assembled screens and against the outer faces of the fine screens 31 and 32. The rolling structure comprises a pair of rollers 55 and 56 which are of truncated formation with their adjacent faces lying substantially parallel along opposite sides of the leaf. These rollers are mounted on spindles 57 and 58 respectively, the spindle 58 being rotatably supported in a relatively fixed bearing 59.

The spindle 60, however, is mounted in a bearing 61 which is carried upon guides 62 and may move vertically. These guides in the present case are a pair of parallel vertically extending rods which are mounted in their parallel position upon a frame 63. This frame is capable of horizontal swinging movement around a vertical shaft 64, and is also designed to slide lengthwise of this shaft so that the roller structure may be adjusted for use in connection with leaves of various dimensions and thicknesses. The bearing 61 for the upper spindle 57 may be adjustably set by the hand wheel 65 and the screw 66.

The rollers 55 and 56 are positively driven in the opposite direction by gears 67 and 68 mounted upon the spindles 57 and 58 respectively. These gears are in mesh and receive their power from a motor 69 mounted on the frame 63 to swing around the post 64. This motor drives a jack shaft 70 through a belt 71 passing around a pulley 72 on the shaft 70. A worm gear 73 is fixed to the shaft 70 and is in mesh with a worm wheel 74 carried by the lower spindle 58.

Thus, due to this driving action and the frictional engagement between the surfaces of the rollers 55 and 56 and the binding members 34, the chucks 16 and 17 will be frictionally driven to rotate around their common vertical axis, and in so doing will cause the entire binding structure to pass between the rollers and to be gradually crimped down as the screw 66 is manually rotated to feed the upper roller 55 down against the binder. After this binder, comprising the members 33 and 34, has been firmly rolled into position, the chucks may then be separated to permit removal of the leaf thus formed, and it will be found that the fine screens 31 and 32 will be firmly held over the opposite faces of the core 30 in their stretched positions.

In operation of the present invention, the screens 30, 31 and 32 are first cut in circular form and to the desired dimension. After this the binding ring 29 which has been previously assembled is slipped over the upper chuck structure 17 and is conveniently supported in a position circumscribing the upper spindle 18, so that after the leaf screens are clamped together it may be moved down to its proper position. While the upper chuck 17 is held in its uppermost position so that a space will occur between the working faces of the chucks 16 and 17, the lower fine screen 31 may be laid on the working face of the lower chuck, after which the coarse core 30 may be placed in position and then covered by the upper fine screen 31. These three screens may then be spaced relative to each other by swinging the spacing fingers 52 upwardly to their vertically aligned positions, as shown in Fig. 5 of the drawings.

After this has been done, the upper chuck may be released and will then be lowered until it rests upon the laminated leaf structure comprising the three screens 30, 31 and 32. This upper chuck will be held in this position due to the superposed weight 28.

While the screens are thus firmly held together, a suitable tool may be inserted in the radial openings 45' of the disks 45 to which are attached the pitman rods 43. The tool may then be operated to rotate the disks 45 in the direction of the arrow —a—, as indicated in Fig. 2, and in so doing will tend to dispose the rods 43 in radially aligned positions relative to the axis of the chucks, and will thus simultaneously and separately force the chuck segments outwardly to stretch the screens 31 and 32.

When the screens have been sufficiently stretched so that they lie perfectly flat and taut over the opposite faces of the core 30, the binding ring 29 may be positioned to circumscribe the marginal edges of the screens and to overhang the same. The rollers 55 and 56 with the driving structure provided therefor, may then be swung horizontally around the vertical post 64 to assume positions on opposite sides of the binding ring 29.

The motor 69 may then be started to drive the rollers and thereafter the wheel 65 may be rotated to pull the rollers together against the opposite sides of the ring. This action will at the same time rotate the chucks 16 and 17 with the screens clamped therebetween, and will progressively roll the flanges of the ring down. After the binder 29 has been firmly clamped in position, the rolling structure 54 may be swung out of operative position relative to the binder, and the upper chuck 17 may then be raised to allow the assembled leaf to be removed.

It will thus be seen that by the arrangement here disclosed, means are provided for tightly stretching and firmly holding the thin screens of a filter leaf upon opposite sides of a central core while applying a binding ring thereto in a manner to hold the screens in their taut condition.

While I have shown the preferred form of my invention as now known to me, it is to be understood that various changes may be made in its construction without departing from the spirit of the invention as defined in the claims.

Having thus described my invention, what I claim and desire to secure by Letters Patent is:

1. In a device of the character described, a pair of members between which a flat sheet of material may be placed, means for exerting pressure on said members to tightly hold said sheet of material, and means forming a part of each of said members acting to stretch said material in all directions from the center thereof and in the plane thereof.

2. A device of the character described comprising a pair of flat chuck plates between the adjacent faces of which a sheet of material may be pressed, the pressure face of each of said plates being formed of a plurality of radial segments, and means for simultaneously causing said segments to move radially, while the plates are exerting pressure on the sheet of material clamped therebetween.

3. In a device of the character described, a chuck plate comprising a circular disk, a plurality of segmental members forming a working face for said disk, means separately supporting said segments on the disk in a manner to permit the segments to move independently of each other and radially of the disk, and simultaneously operating means for moving the segments radially of the disk.

4. In a device of the character described, a chuck plate comprising a circular disk, a plurality of segmental members forming a working face for said disk, a pressure surface being formed on each of the segments by a thickness of ductile metal, means separately supporting said segments on the disk in a manner to permit the segments to move independently of each other and radially of the disk, and simultaneously operating means for moving the segments radially of the disk.

5. A device of the character described comprising a main frame, a lower chuck spindle vertically disposed and rotatably supported in said main frame, an upper chuck spindle in longitudinal vertical alignment with said lower spindle and supported for rotating and reciprocating movement on said frame, complementary chuck plates carried by the adjacent ends of said spindles and aligned to clamp sheets of material between their adjacent faces, and means for exerting pressure on the upper chuck plate to produce said clamping action.

6. A device of the character described comprising a main frame, a lower chuck spindle vertically disposed and rotatably supported in said main frame, an upper chuck spindle in longitudinal vertical alignment with said lower spindle and supported for rotating and reciprocating movement on said frame, complementary chuck plates carried by the adjacent ends of said spindles and aligned to clamp sheets of material between their adjacent faces, means for lifting the upper chuck plate to separate the two chuck plates, and means for exerting pressure on the upper chuck plate to produce said clamping action.

7. A device of the character described comprising a main frame, a pair of vertically and longitudinally aligned spindles, chuck plates carried by the adjacent ends of said spindles and adapted to exert pressure on a flat sheet of material disposed between the working faces thereof to hold the sheet of material flat, means whereby the chuck plates may be actuated to radially stretch the sheet of material disposed between the working faces thereof, and rolling means for acting upon the edge of the sheet of material projecting beyond the edge of the chuck plates.

LOUIS LAKE EDMUNDS.